United States Patent
Kulkarni et al.

(10) Patent No.: US 11,568,038 B1
(45) Date of Patent: Jan. 31, 2023

(54) THRESHOLD-BASED AUTHENTICATION

(71) Applicant: Amazon Technologies, Inc., Seattle, WA (US)

(72) Inventors: Harshad Vasant Kulkarni, Bellevue, WA (US); Ashish Rangole, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/709,194

(22) Filed: Sep. 19, 2017

(51) Int. Cl.
   *H04L 67/306* (2022.01)
   *H04L 9/40* (2022.01)
   *G06F 21/40* (2013.01)

(52) U.S. Cl.
   CPC ............ *G06F 21/40* (2013.01); *H04L 63/102* (2013.01); *H04L 67/306* (2013.01)

(58) Field of Classification Search
   None
   See application file for complete search history.

(56) References Cited

U.S. PATENT DOCUMENTS

| | | |
|---|---|---|
| 8,528,071 B1 | 9/2013 | Kwan |
| 2004/0039834 A1 | 2/2004 | Saunders et al. |
| 2006/0072378 A1 | 4/2006 | Bruekers |
| 2008/0072261 A1 | 3/2008 | Ralston et al. |
| 2010/0305729 A1 | 12/2010 | Glitsch et al. |
| 2011/0078729 A1 | 3/2011 | LaJoie et al. |
| 2013/0015946 A1* | 1/2013 | Lau ............ G06V 10/422 340/5.2 |
| 2015/0088967 A1 | 3/2015 | Muttik |
| 2015/0199502 A1* | 7/2015 | Chen ............ G06F 21/32 705/325 |
| 2015/0244699 A1* | 8/2015 | Hessler ............ H04W 12/062 726/7 |
| 2016/0284020 A1* | 9/2016 | Williams ............ G06Q 20/14 |
| 2017/0053107 A1* | 2/2017 | Nahari ............ G06F 21/34 |

OTHER PUBLICATIONS

Flood et al., "Peer to peer authentication for small embedded systems: A zero-knowledge-based approach to security for the Internet of Things." In the 10th International Conference on Digital Technologies 2014, pp. 68-72. IEEE, 2014. (Year: 2014).*

Heng et al., 2014. GPS signal authentication from cooperative peers. IEEE Transactions on Intelligent Transportation Systems, 16(4), pp. 1794-1805. (Year: 2014).*

Saxena et al., "Applications of Pairings in GRID Security", IEEE, 2006, http://citeseerx.ist.psu.edu/viewdoc/download;sessionid=3C169904CB6A6497F06B320C9FE72A03?doi-10.1.1.138.5547&rep-rep1&type=pdf, 4 pages.

(Continued)

*Primary Examiner* — Luu T Pham
*Assistant Examiner* — Edward X Long
(74) *Attorney, Agent, or Firm* — Davis Wright Tremaine LLP

(57) ABSTRACT

An authentication system receives authentication information from a user as part of a request to access a web-based service. The authentication system transmits the authentication information to a set of second users authorized to evaluate the authentication information. If a threshold number of the set of second users authenticate the identity of the first user, the authentication system enables the user to access the web-based service.

18 Claims, 8 Drawing Sheets

(56) References Cited

OTHER PUBLICATIONS

Hu et al., "Efficient Constructions for One-Way Hash Chains," Springer-Verlag Berlin Heidelberg, 2005, http://download.springer.com/static/pdf/259/chp%253A10.1007%252F11496137_29.pdf?originUrl=http%3A%2F%2Flink.springer.com%2Fchapter%2F10.1007%2F11496137_29&token2=exp=1449840148-acl=%2Fstatic%2Fpdf%2F259%2Fchp%25253A10.1007%25252F11496137_29.p, pp. 423-441.
Silva, "An Overview of Cryptograhpic Hash Functions and Their Uses," SANS Institute 2003, https://www.sans.org/reading-room/whitepapers/vpns/overview-cryptographic-hash-functions-879, 13 pages.
Boyle, "Amazon patents a method for identity authentication that uses music as the key," retrieved Oct. 31, 2017, from https://www.geekwire.com/author/alanboyle/, 3 pages.
Wikipedia, "Close Encounters of the Third Kind," retrieved Nov. 1, 2017, from https://en.wikipedia.org/wiki/Close_Encounters_of_the_Third_Kind, 18 pages.
The Telegraph, "The scienced of Close Encounters: could we use music to talk to aliens?," retrieved Nov. 1, 2017, from http://www.telegraph.co.uk/films/0/science-close-encounters-third-kind-could-use-music-talk-aliens/, 5 pages.

\* cited by examiner

THRESHOLD-BASED AUTHENTICATION

BACKGROUND

Service providers often require users to provide authentication information in order to access one or more services provided by these service providers. For instance, a user can provide a username and corresponding password to a service to enable the service to authenticate the user and to enable the user to perform certain operations. However, for some users, additional authentication information is required. Evaluation of this additional authentication information can be complex, resulting in significant friction for a service as additional resources are used to evaluate the additional authentication information to determine whether a user can be authenticated.

BRIEF DESCRIPTION OF THE DRAWINGS

Various techniques will be described with reference to the drawings, in which.

DETAILED DESCRIPTION

Figure 1:
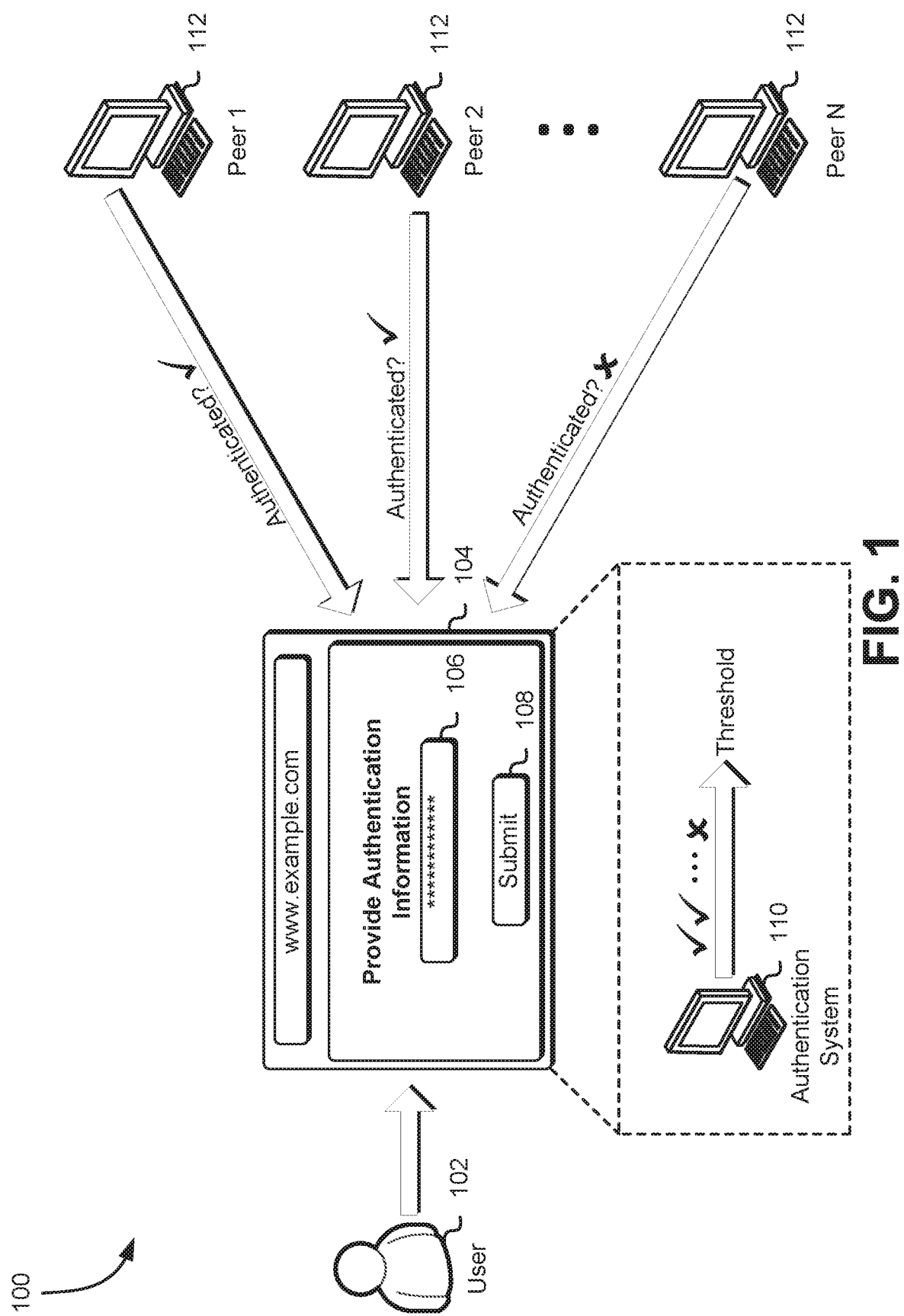
FIG. 1 shows an illustrative example of a system in which various embodiments can be implemented.

Techniques described and suggested herein relate to threshold-based authentication via distribution of authentication information to a set of peers to obtain authentication responses. In an embodiment, a service receives a request from a user device. The request includes information that is usable to identify a user account and any policies that are applicable to the account. Based at least in part on the policies, the service identifies authentication mechanisms to be provided to the user device. In an embodiment, the service updates an interface to enable the user to select, via the user device, the authentication mechanisms and to provide authentication information using the selected authentication mechanisms. Alternatively, in an embodiment, the service prompts the user, via the user device, to provide authentication information using the identified authentication mechanisms.

In an embodiment, in response to receiving the authentication information from the user device, the service identifies a set of entities (e.g., administrators of the service, owners of the resources to be accessed, associates of the user, other users, etc.) that are authorized to evaluate the provided authentication information and to provide an authentication response. In one embodiment, identifiers corresponding to this set of entities are specified in a policy that is applicable to the user account. In another embodiment, the service maintains a database that specifies entities that are capable of evaluating authentication information from a user device and to provide an authentication response. The service selects a set of entities from the database to enable authentication of the user device.

The set of entities transmit their respective authentication responses to the service. In an embodiment, the service evaluates the received authentication responses to determine whether a threshold has been reached for authenticating the user. If the threshold has not been reached, the service determines whether additional responses from the set of entities can result in the threshold being reached. In an embodiment, if the service determines that the threshold cannot be reached, the service denies the request. However, if the threshold is still attainable using additional authentication responses from the entities, the service awaits these additional authentication responses from the entities. Once the service has received the requisite authentication responses, the service determines whether the responses result in the threshold being reached. If so, the computing resource service determines if the responses indicate that the user is authenticated. If so, the user is given access to the service. However, if the service determines that the threshold cannot be reached or that the authentication responses indicate that the user has not been authenticated, the service denies the request.

In this manner, in an embodiment, the service relies on a plurality of entities to provide authentication responses that are used to determine whether a request can be fulfilled. In addition, the techniques described and suggested herein facilitate additional technical advantages. In an embodiment, an entity receiving the authentication information from the service transmits a request to the service to obtain, from the user device, additional authentication information that is usable by the entity to generate an authentication response. The request specifies the authentication mechanism to be used by the service to obtain the authentication information. The service presents to the user device the selected authentication mechanism and obtains the additional authentication information. In an embodiment, the entity obtains the additional authentication information and generates an authentication response that can be used in the service's threshold determination. This provides flexibility for an entity to require additional authentication information for vetting a user at any time.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a user 102 transmits, via a user interface 104 provided by a computing resource service and through a user device, a request to access one or more resources provided by the computing resource service. In an embodiment, the user interface 104 is a graphical user interface (GUI) that provides the user 102 with an ability to interact with elements presented by the computing resource service via the GUI. In one embodiment, the request from the user 102 specifies a username or other information usable to identify an account of the user 102 maintained by the computing resource service. In one embodiment, the user 102 is a customer of the computing resource service and is a member of an organization comprising other users and administrators that delegate access to computing resources to these users. In response to the request from the user 102, the computing resource service utilizes the provided username or other information to identify an account of the user 102. In an embodiment, the account specifies other information that uniquely identifies the user 102, such as the organization that the user 102 belongs to, location information, contact information (e.g., electronic addresses, physical addresses, telephone numbers, etc.), and the like. In an embodiment, the user 102 is a human utilizing a user device, an automated process, an application, a service, or any other entity.

In an embodiment, based at least in part on information specified in the user's account, the computing resource service identifies one or more policies that are applicable to the request. The one or more policies specify a set of permissions that define a user's level of access to the one or more computing resources provided by the computing resource service. In an embodiment, a permission may specifies a principal, a resource, an action, a condition, and an effect. In one embodiment, a permission also specifies a plurality of one or more of these elements such as a set or class of users, a collection of resources, several different actions, and/or multiple conditions. The principal is a user, a group, an organization, a role, or a collection and/or combination of these or other such entities. A principal, in an embodiment, is an entity that is capable of submitting application programming interface (API) calls that cause an action associated with a resource to be performed and/or any entity to which permissions associated with a resource is granted. In an embodiment, the computing resource service identifies one or more policies that identify the user 102 as the principal or a group of users in which the user 102 is a member.

The one or more policies, in one embodiment, specify the authentication mechanisms that the computing resource service is to provide to the user 102 in order to determine whether the user 102 is to be granted access to the requested resources. These authentication mechanisms, in one embodiment, are defined in a condition field of the one or more policies. The authentication mechanisms, in an embodiment, cause the computing resource service to present to the user 102, via the user interface 104, one or more authentication challenges to cause the user 102 to provide credential information that is usable to authenticate the user 102. In an embodiment, and as illustrated in FIG. 1, the computing resource service prompt the user 102 to provide, via an authentication information input field 106, its authentication information. The computing resource service also provides the user 102 with a submit button 108, which the user 102 uses to submit the provided authentication information. It should be noted that while FIG. 1 illustrates textual information provided by the user 102 via the interface 104, other forms of authentication information are available based at least in part on the identified policies. These other forms of authentication information include, but are not limited to, digital video recordings, digital audio recordings, user challenge responses, and the like.

In an embodiment, in response to receiving the authentication information provided by the user 102, the computing resource service, via an authentication system 110, selects one or more peers 112 that are to evaluate the provided authentication information and provide an authentication response that indicates whether the user 102 has been authenticated. In one embodiment, the computing resource service maintains a peer database that specifies one or more peers 112 that can evaluate authentication information from users of the computing resource service. In an embodiment, each entry in the peer database specifies an identifier of a particular peer, as well as the authentication information that can be evaluated by the peer 112. The entry in the peer database also specifies information regarding the role performed by the peer 112 within the organization (e.g., administrator, group leader, group member, etc.). In some embodiments, the authentication system 110 weighs the authentication responses from the peers 112 according to the individual roles of these peers 112. A response from a peer 112 that has been designated as an administrator or group leader is given a greater weight over a response from another peer 112 that has been designated as a group member. In an embodiment, any of the peers 112 are computer systems that perform operations on behalf of a human operator to prepare an authentication response. Further, some of the peers 112 include human operators that can manually evaluate the authentication information to generate an authentication response.

The authentication system 110, based at least in part on the entries specified in the peer database, selects a set of peers 112 that are to evaluate the received authentication information from the user 102. In one embodiment, the authentication system 110 selects the set of peers 112 such that the authentication responses from this set of peers 112 are usable to determine whether a threshold for authentication of the user 102 has been reached. In one embodiment, the threshold for authentication is achieved in response to a minimum number or percentage of authentication responses from the peers 112 indicating that the user 102 has been authenticated. The threshold is part of a set of thresholds usable to determine whether a quorum has been formed for making an authentication determination. Thus, a quorum, in an embodiment, can be formed by meeting any of a set of thresholds whereby, if any threshold is reached, the quorum is formed. As noted above, the authentication responses are weighed in accordance to the role of each peer 112 in the set of peers 112. In an embodiment, an authentication response from an administrator is considered to constitute multiple authentication responses as opposed to a single authentication response from a peer 112 that is a member of the administrator's group.

In an embodiment, selection of the set of peers 112 is performed based at least in part on prior performance of each of the peers 112 in evaluating authentication information from users. The authentication system 110 evaluates past peer availability for evaluating authentication information and providing an authentication response based at least in part on this evaluation. In one embodiment, the authentication system 110 provides, to each peer identified in the peer database, sample authentication information that is used to evaluate the performance of the peers 112. In an embodiment, the authentication system 110 prepares the sample authentication information and maintains the expected authentication response that should be provided by the peers being evaluated. Based at least in part on the authentication responses from these peers 112, the authentication system 110 determines which peers 112 are more accurate in evaluating authentication information from users. This evaluation of peers 112 is used to update the peer database and to select the peers 112 that are to evaluate the authentication information from the user 102. These evaluations are performed by the authentication system 110 periodically or in response to a triggering event (e.g., suspicious activity detected, peers are removed from the pool of available peers, etc.) to improve the accuracy of the peer database and to identify reliable peers 112 for evaluation of authentication information.

If the authentication system 110 determines that one or more of the selected set of peers 112 are unavailable to evaluate the provided authentication information, the authentication system 110, in an embodiment, determines whether other peers 112 are available that can evaluate the authentication information. If, after the timeout period has been reached, no additional peers 112 are identified, resulting in all of the thresholds being unattainable, the authentication system 110 denies the user's request to access the requested resources, as a definitive authentication response from the set of peers 112 is no longer attainable. If other peers are available, the authentication system 110 provides the authentication information to these other peers for their evaluation. In an embodiment, if these other peers are not as reliable as those originally selected, the authentication system 110 weighs responses from these other peers less than authentication responses from originally selected peers 112. Thus, this reduces the possibility of an erroneous authentication decision being made by the authentication system 110 based at least in part on the responses obtained from the set of peers 112.

In one embodiment, the authentication information includes multiple sets of data that can be individually evaluated by a peer 112. The authentication information, in one embodiment, includes an audiovisual recording that comprises an audial element and one or more visual elements that can be evaluated by the set of peers 112. The authentication system 110 selects the set of peers 112 according to the ability of each of these set of peers 112 to evaluate an individual element of the provided authentication information. The authentication system 110 selects a peer 112 that can evaluate the audial element of the authentication information to determine whether the audial element was created by the user 102 or by some other entity that is attempting to assume the identity of the user 102. Similarly, the authentication system 110 selects another peer 112 that can evaluate a visual element of the authentication information provided by the user 102. In an embodiment, the authentication system 110 provides these individual elements to multiple peers 112 to determine whether a threshold is reachable for each of these elements. The resulting determination for each element is used to determine whether an overall threshold for authentication is reached.

Once the authentication system 110 has transmitted the authentication information from the user 102 to the set of peers 112, the authentication system 110, in an embodiment, awaits authentication responses from the set of peers 112 to determine whether the user 102 has been authenticated. As the authentication system 110 receives authentication responses from the set of peers 112, the authentication system 110 evaluates these responses to determine whether a threshold has been reached. In one embodiment, a threshold denotes a minimum requirement for an authentication decision regarding the user 102 request based at least in part on the authentication responses. A threshold, in one embodiment, denotes a minimum number of received authentication responses that indicate whether the user 102 has been authenticated for the authentication system 110 and is granted access to the requested resources. The threshold, in one embodiment, is part of a set of thresholds usable to determine whether a quorum has been formed. Each threshold of the set of thresholds defines a particular requirement such that if any threshold is reached, the quorum is formed. Further, each threshold defines a distinct rule for forming the quorum including, but not limited to, a minimum number of peers having a particular role providing an authentication response indicating that the user 102 has been authenticated, a majority of peers 112 reaching a consensus as to an authentication decision, and the like.

In an embodiment, in response to receiving an authentication response from a peer 112, the authentication system 110 determines whether a threshold has been reached for generating an authentication decision. If a threshold has not been achieved, the authentication system 110 determines whether a timeout period has elapsed for authentication responses. The timeout period corresponds to a maximum amount of time that peers 112 have to provide an authentication response before responses from these peers 112 are omitted from the authentication decision. Thus, if the timeout period has elapsed, the authentication system 110 stops waiting for additional responses from other peers 112 and determines whether an authentication decision can be generated using the received responses. If the authentication system 110 determines that an authentication decision is impossible to generate due to a lack of responses from the peers 112, the authentication system 110 denies the user 102 request.

Based at least in part on the received authentication responses, the authentication system 110, in an embodiment, determines whether a threshold has been reached for generating an authentication decision with regard to the user 102 request. If a threshold has been reached, the authentication system 110 evaluates the received responses to determine whether these responses indicate that the user 102 has been authenticated by the set of peers 112. If the authentication system 110 determines that the responses from the set of peers 112 indicate that the user 102 has not been authenticated, the authentication system 110 generates an authentication decision denoting that the user 102 is not authenticated and that the request is to be denied. The computing resource service, in response to this authentication decision, denies the user 102 request. Alternatively, if the authentication system 110 determines that the responses from the set of peers 112 indicate that the user 102 has been authenticated, the authentication system 110 generates an authentication decision that causes the computing resource service to fulfill the user 102 request or to evaluate additional policies to determine whether the user 102 is authorized to access the requested resources.

In an embodiment, a peer 112 can transmit a request to the authentication system 110 to obtain additional authentication from the user 102 that is usable by the peer 112 to generate an authentication response. The request specifies an authentication mechanism that is usable by the authentication system 110 to elicit authentication information from the user 102. In an embodiment, the authentication mechanism selected by the peer 112 is distinct from the authentication mechanisms used originally by the authentication system 110 to obtain the user's authentication information and provided to the set of peers 112. The authentication system 110 updates the user interface 104 to perform the authentication mechanism to present, to the user 102, a new authentication challenge and obtain authentication information corresponding to this authentication mechanism from the user 102. The authentication system 110 provides this authentication information to the peer 112 that requested the additional authentication information. In an embodiment, if the user 102 does not provide authentication information for the authentication mechanism selected by the peer 112, the peer 112 provides an authentication response indicating that the user 102 could not be authenticated. Alternatively, the authentication system 110 transmits a notification to the peer 112 indicating that no authentication information was received. Further, the authentication system 110 records an authentication response for the peer 112 that indicates that the user 102 was not authenticated.

In an embodiment, if the authentication system 110 determines that the user 102 is not authenticated based at least in part on the received authentication responses from the one or more peers 112, the authentication system 110 determines whether other authentication mechanisms are available for soliciting additional authentication information from the user 102. These other authentication mechanisms are, in an embodiment, more stringent than the original authentication mechanisms used by the authentication system 110 to obtain the authentication information from the user 102. Alternatively, in an embodiment, the other authentication mechanisms are distinct from those utilized to generate the original authentication challenges to the user 102 and to obtain the authentication information. The process for selecting a set of peers 112 is similar to that described above. However, in an embodiment, the authentication system 110 selects additional peers for evaluation of newly obtained authentication information from the user 102 or changes the thresholds for authentication using the authentication responses from the set of peers 112. Thus, subsequent responses from the user 102 to these new authentication challenges are subject to additional scrutiny and require a greater threshold of positive responses from the set of peers 112 for successful authentication. If the user 102 fails these subsequent challenges, the authentication system 110 rejects the user's request. In an embodiment, this additional process is performed regardless of whether previous thresholds have been satisfied and are, in an embodiment, subject to the policies identified by the authentication system 110 based at least in part on the identity of the user 102 and the nature of the request submitted by the user 102.

Figure 2:
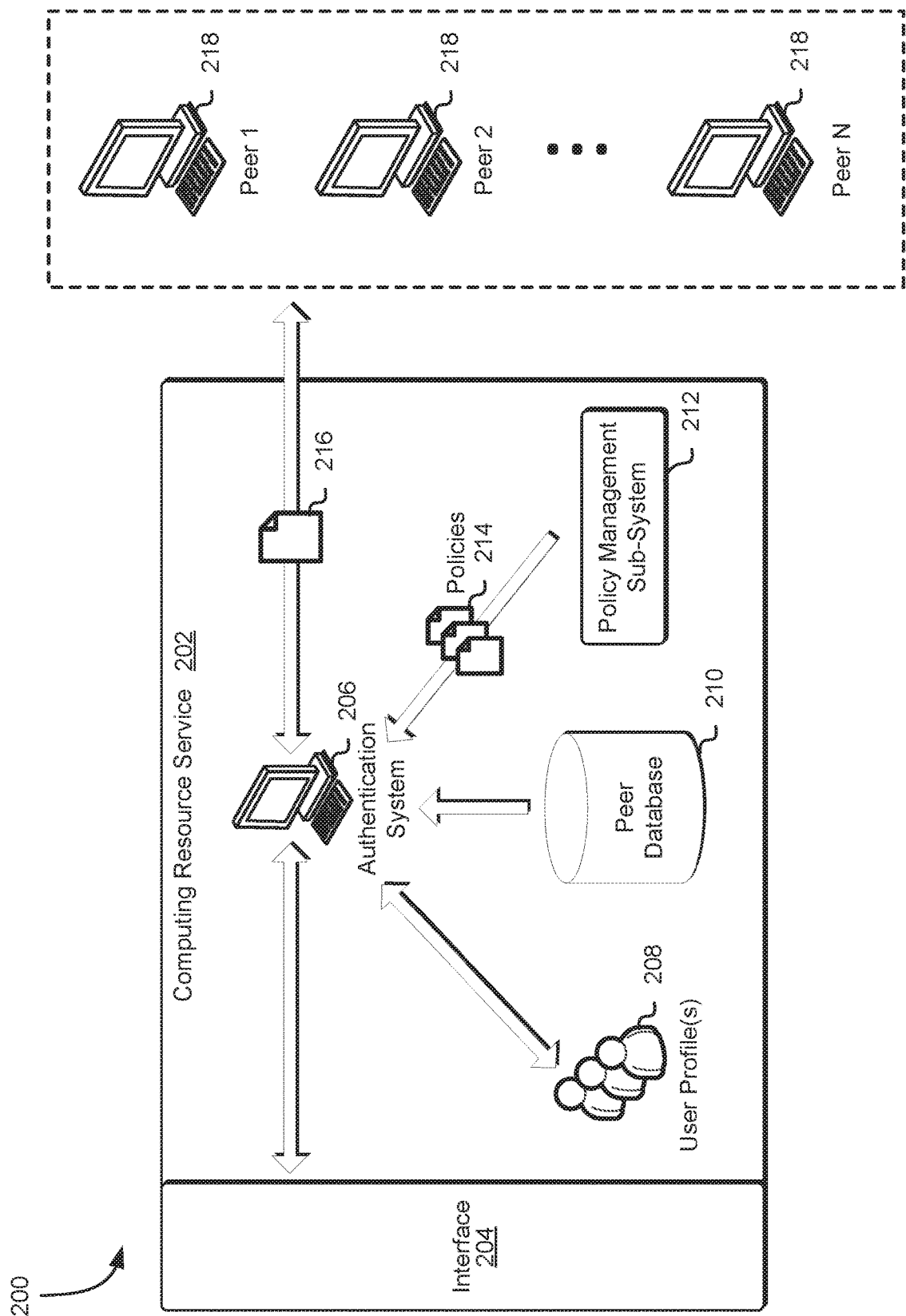
FIG. 2 shows an illustrative example of a system in which an authentication system selects a set of peers for evaluation of authentication information to determine whether a threshold is reached for authenticating a user in accordance with at least one embodiment.

FIG. 2 shows an illustrative example of a system 200 in which an authentication system 206 selects a set of peers 218 for evaluation of authentication information 216 to determine whether a threshold is reached for authenticating a user in accordance with at least one embodiment. In the system 200, a computing resource service 202 provides an interface 204 to users of the computing resource service 202. In one embodiment, the interface 204 is a GUI comprising one or more elements through which a user can interact with the computing resource service 202 and submit requests to access resources provided by the computing resource service 202. The computing resource service 202, through the interface 204, prompts a user to provide information that is usable to identify a user profile that specifies information about the user, as well as organization data usable to identify a set of peers 218 associated with the user that can authenticate the user. In one embodiment, the organization data specifies the organizational structure that the user belongs to. This organizational structure defines administrators, managers, group leaders, team members, and other entities that are associated with the user. This organizational structure is usable to select the set of peers 218 that can evaluate authentication information from the user to determine whether the user is authenticated.

In an embodiment, the computing resource service 202 includes an authentication system 206, which is a computer system that processes incoming user requests to determine whether the user is authenticated. In an embodiment, the authentication system 206 receives, from the interface 204, user information that is usable to identify the user's profile from a user profile repository 208. The user information, in one embodiment, includes a username or other identifying information usable to identify the user's profile. The authentication system 206 accesses the user profile repository 208 and utilizes the user information to access the user's profile. In an embodiment, the profile specifies information about the user and organization data, as specified above. The authentication system 206 evaluates this information from the user's profile to identify candidate peers that can evaluate authentication information from the user. In an embodiment, the user's profile also specifies that authentication mechanisms for generating authentication challenges usable to elicit authentication information from the user. In one embodiment, the user's profile specifies the devices utilized by the user to access the computing resource service 202, as well as the capabilities of these devices (e.g., audio recording, video recording, geolocation, etc.).

In one embodiment, the authentication system 206 transmits a request to a policy management sub-system 212 to identify one or more policies 214 that are applicable to the user request. The policies 214, in an embodiment, include user policies and resource policies. The user policies identify the user as the principal and are applicable to any request from the user. The resource policies, alternatively, are applicable to any request for access to the resources specified within. The authentication system 206, in its request to the policy management sub-system 212, provides user information from the user's profile that is usable to identify any applicable user policies. Additionally, the authentication system 206 provides information regarding the resources requested to enable the policy management sub-system 212 to identify any resource policies applicable to the request. The policy management sub-system 212, in one embodiment, is a computer system that maintains policies applicable to resources provided by the computing resource service 202 and to users of the computing resource service 202. These policies are defined by the computing resource service 202 itself and by administrators/owners of computing resources maintained by the computing resource service 202 in order to define a level of access to these computing resources. The policies 214, in an embodiment, specify one or more authentication mechanisms that are required for enabling the user to access the requested resources. These authentication mechanisms can be specific to the user submitting the request or to the requested resources. The authentication mechanisms are used by the computing resource service 202 to generate authentication challenges for obtaining authentication information from users. An authentication challenge includes information that is presented to the user (e.g., a question, instructions, an interface, etc.) to elicit a response comprising authentication information. In an embodiment, responding to the authentication challenge comprises providing input to enable password authentication, facial gesture authentication, non-facial gesture authentication (e.g., performing one or more bodily gestures that do not include facial gestures, audial authentication, biometric authentication, and/or other forms of authentication.

The authentication system 206, in an embodiment, evaluates the policies 214 from the policy management subsystem 212 and the information from the user's profile to determine the authentication mechanisms usable to generate one or more authentication challenges and elicit authentication information from the user. In an embodiment, the authentication system 206 accesses a peer database 210 maintained by the computing resource service 202 to identify a set of peers 218 that are able to evaluate any authentication information provided by the user using the identified authentication mechanisms. The peer database 210 includes an entry for each peer 218 that includes authentication information from various sources and obtained through various mechanisms. A peer 218, in one embodiment, is another user of the computing resource service 202 that is authorized to evaluate requests from a user to access resources provided by the computing resource service 202. A peer 218 can include an administrator of the computing resource service 202, a group leader of a group that the user is a part of, a colleague of the user, and the like. Each peer 218, in an embodiment, defines the types of authentication information that it is capable of evaluating.

Each entry in the peer database 210, in an embodiment, specifies the role of the corresponding peer within the user's organization or with regard to the computing resource service 202. In an embodiment, an entry in the peer database 210 also specifies the weight that is given to authentication responses from the corresponding peer. This weight is used by the authentication system 206 to determine whether a threshold has been reached based at least in part on obtained authentication responses from the set of peers 218. In an embodiment, each entry in the peer database 210 also specifies a reputation score for the corresponding peer 218. The reputation score denotes the peer's historical performance in evaluating authentication information from users, including its accuracy in determining an authentication response and responding to requests from the authentication system 206 in a timely manner. The authentication system 206, in an embodiment, uses the reputation score for each peer identified in the peer database 210 to select a set of peers 218 that is to evaluate authentication information from the user to generate authentication responses for the authentication system 206.

In an embodiment, the authentication system 206 updates the interface 204 to present the user with one or more authentication challenges to provide, via the selected authentication mechanisms, authentication information usable to authenticate the user. If the user does not provide the requested authentication information, the authentication system 206 denies the user request. However, if the user provides the requested authentication information, the authentication system 206 evaluates the authentication information to determine which peers 218 identified in the peer database 210 are to evaluate a subset of the authentication information. In an embodiment, the authentication system 206 parses the authentication information to identify subsets of the authentication information that can be evaluated by the set of peers 218. In an embodiment, if the authentication information provided by the user includes an audiovisual recording where the user provides an audial response and a visual response, the authentication system 206 generates a subset of the authentication information corresponding to the audial response and one or more subsets of the authentication information corresponding to elements of the visual response (e.g., facial gestures, non-facial gestures, environment attributes, etc.). The authentication system 206 identifies a peer 218 that can evaluate a subset of the authentication information. Based at least in part on the subsets identified, the authentication system 206 transmits the authentication information 216 to the set of peers 218 selected by the authentication system 206.

At any time after transmitting the authentication information 216 to the set of peers 218, the authentication system 206, in an embodiment, receives authentication responses from one or more of the set of peers 218. An authentication response indicates whether the peer 218 has authenticated the user or has determined that the user cannot be authenticated. In response to receiving an authentication response from a peer 218, the authentication system 206 evaluates the response and determines whether a threshold has been reached for reaching an authentication decision. In an embodiment, a threshold is reached when a minimum number or percentage of the total expected authentication responses result in a consensus among the set of peers 218 regarding authentication of the user. In one embodiment, this threshold is part of a set of thresholds usable to determine whether a quorum has been formed. Each threshold defines a minimum requirement that, if satisfied, denotes the formation of the quorum.

In one embodiment, a peer 218 submits a request to the authentication system 206 to obtain additional authentication information usable by the peer 218 to provide an authentication response. The request from the peer 218 specifies the authentication mechanism that the authentication system 206 is to use to obtain the additional authentication information. Further, the request from the peer 218 specifies the parameters to be used to prompt the user to provide the additional authentication information. This includes unique actions that the user is to perform to provide the authentication information. In response to the request, the authentication system 206 updates the interface 204 to prompt the user to provide the additional authentication information using the peer-selected authentication mechanism. If the user provides, via the interface 204, the additional authentication information, the authentication system 206 provides the additional authentication information to the peer 218 that submitted the request. However, in an embodiment, if the user does not provide the requested additional authentication information, the authentication system 206 generates an authentication response on behalf of the peer 218 indicating that authentication of the user is not possible. This response is used to determine whether a threshold has been reached for determining an authentication decision.

In an embodiment, if a threshold has been reached, the authentication system 206 determines, based at least on the authentication responses received, whether the user has been authenticated by the peers 218 that have provided these authentication responses. In an embodiment, if the authentication responses indicate that the user has not been authenticated by the corresponding peers 218, the authentication system 206 denies the user request to access the computing resource service 202 and the requested computing resources. Additionally, in one embodiment, the authentication system 206 updates the interface 204 to indicate that the user's request has been denied.

In an embodiment, if the authentication responses indicate that the user has been authenticated by the set of peers 218, the authentication system 206 enables the user to access the computing resource service 202 and the requested computing resources. The authentication system 206, in one embodiment, updates the peer database 210 based at least in part on the received authentication responses from the set of peers 218. If a peer 218 did not provide a timely response to the authentication system 206, the authentication system 206 updates the peer database 210 to denote that the peer 218 was not responsive and, in one embodiment, reduce the peer's authentication score. This reduction in score, in an embodiment, reduces the likelihood that the peer 218 will be selected for providing authentication responses. Alternatively, if a peer 218 provided an authentication response in a timely manner and the authentication response was accurate (e.g., further evaluation by an administrator or owner of the computing resources denotes that the user was authenticated by the peer 218 correctly, etc.), the authentication system 206 updates the peer database 210 to increase the peer's authentication score. This increase in score, in an embodiment, increases the likelihood that the peer 218 will be selected for providing authentication responses.

Figure 3:
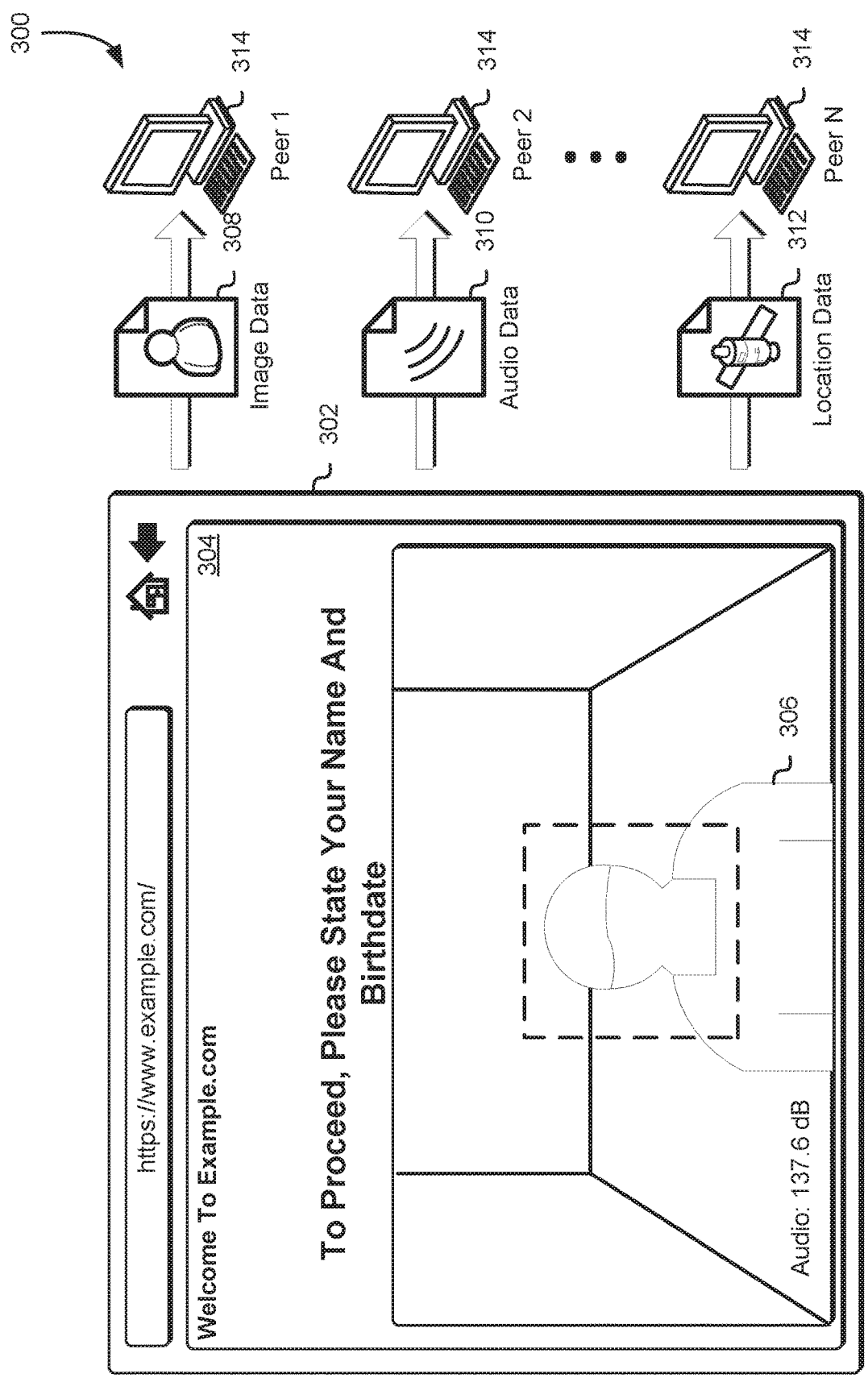
FIG. 3 shows an illustrative example of a system in which individual subsets of authentication information provided by a user are transmitted to a set of peers for evaluation to determine whether a threshold is reached for authenticating the user in accordance with at least one embodiment.

FIG. 3 shows an illustrative example of a system 300 in which individual subsets of authentication information provided by a user are transmitted to a set of peers 316 for evaluation to determine whether a threshold is reached for authenticating the user in accordance with at least one embodiment. In the system 300, an authentication system of a computing resource service updates an interface 302, such as a GUI, to prompt a user to provide authentication information. As illustrated in FIG. 3, the authentication system prompts the user to provide a recording of the user, whereby the user is required to state its name and provide its birthdate in the recording. In one embodiment, the authentication system transmits one or more executable instructions to an application installed on the user's computing device to cause the user's computing device to record authentication information using one or more peripheral devices of the user's computing device.

In one embodiment, the interface 302 provided by the computing resource service includes a recording window 304, which provides the user with a preview of the authentication information being recorded. This allows the user 306 to view the authentication information that is provided to the authentication system in response to the authentication system's request. In one embodiment, the recording window 304 includes one or more controls usable by the user 306 to initiate recording of the authentication information, to stop recording of the authentication information, to generate additional recordings, to delete an existing recording, and the like. Through the recording window 304, the user 306 submits the requested authentication information to the authentication system.

As noted above, in an embodiment, the authentication system interacts with peripheral devices of the user's computing device to enable the user to generate the requested authentication information. The peripheral devices installed on the computing device include a GPS antenna, a microphone, and a camera, although not all embodiments of the present disclosure will include all such peripheral devices and additional peripheral devices are, in some embodiments, installed on the computing device in addition to or as an alternative to the peripheral devices explicitly described herein.

The GPS antenna, in an embodiment, is installed on the computing device to identify the location of the computing device on Earth's surface. The GPS antenna, along with an integrated GPS receiver installed on the computing device, is used to communicate with four or more satellites orbiting Earth to determine a distance between the GPS receiver and each of the four or more satellites. Further, the GPS receiver receives the location of these four or more satellites orbiting the Earth's surface from each of these satellites in the form of radio signals. With this information, the GPS receiver utilizes three-dimensional trilateration to calculate the location of the GPS receiver on the Earth's surface. Thus, the GPS antenna and GPS receiver is utilized to determine location data 312 usable for authentication of the user 306. Location data 312 is determined in other ways in accordance with various embodiments. A location determination module, in one embodiment, is also stored in memory (e.g., module of executable code) and determines the location of the computing device (i.e., to cause a device executing the code to determine the location). The location determination module is configured to determine location using network positioning services or facilities. In an embodiment, the location determination module queries a cellular data carrier to provide positioning information for the computing device based at least in part on time-difference-of-arrival data to several cellular radio sites. The location determination module also receives information from data networks or third-party providers which associate a particular network address to a particular location.

In an embodiment, a microphone is installed on the computing device to detect and record audio input from the user's surrounding environment. The microphone converts acoustic waves into electrical signals, which a processor uses to measure the intensity of the acoustic waves. Further, the processor records the electrical signals from the microphone into audio data 310, which is used by an audio software application to analyze the recorded audio input and, based at least in part on the analysis, determine certain characteristics of the audio input. In an embodiment, a peer 314 uses an audio software application to identify the requested authentication information (e.g., stated user name and birthdate) and to determine whether the provided audio data 310 corresponds to the user 306. Further, the audio software application can discern whether other audio producing devices are operating within the user's surrounding environment. In an embodiment, if a peer 314 determines, using the audio software application, that other audio producing devices are operating within the user's surrounding environment, the peer 314 generates a negative authentication response. Alternatively, in an embodiment, the peer 314 submits a request to the authentication system to prompt the user 306 to disable these other audio producing devices.

The user's computing device, in an embodiment, includes a camera, which is installed on the computing device for a variety of purposes. In an embodiment, the camera is used to capture a pictographic (e.g., visual) representation of the surrounding environment, which is used to determine, among other things, the characteristics of the surrounding environment, the physical characteristics of the user 306 (e.g., facial features, hair color, eye color, etc.), facial gestures provided by the user 306, and non-facial gestures provided by the user 306 (e.g., gestures made using bodily movement with the exclusion of facial movements). This information is recorded by the camera in the form of image data 308. In an embodiment, the authentication system provides the image data 308 to one or more peers 314 to enable these one or more peers 314 to provide an authentication response to the authentication system. In one embodiment, the authentication system divides the image data 308 into one or more vectors, whereby the one or more vectors correspond to different features recorded using the camera. A peer 314, in one embodiment, is provided one or more vectors of the image data 308 corresponding to non-facial gestures performed by the user 306. Another peer is provided with one or more other vectors of the image data 308 corresponding to facial gestures performed by the user 306. Thus, the authentication system divides the image data 308 into different vectors to enable solicitation of additional authentication responses from the peers 314.

In an embodiment, the authentication system receives the authentication information from the user via the interface 302. The authentication system parses the authentication information into its constituent parts to generate the image data 308, the audio data 310, the location data 312, and other data is usable by a peer 314 to generate an authentication response. In one embodiment, the authentication system accesses a peer database to identify a set of peers 314 that are capable of evaluating the parsed authentication information. Thus, the authentication system uses the peer database to identify individual peers 314 capable of evaluating the image data 308, audio data 310, location data 312, and/or other data obtained from the provided authentication information.

Figure 4:
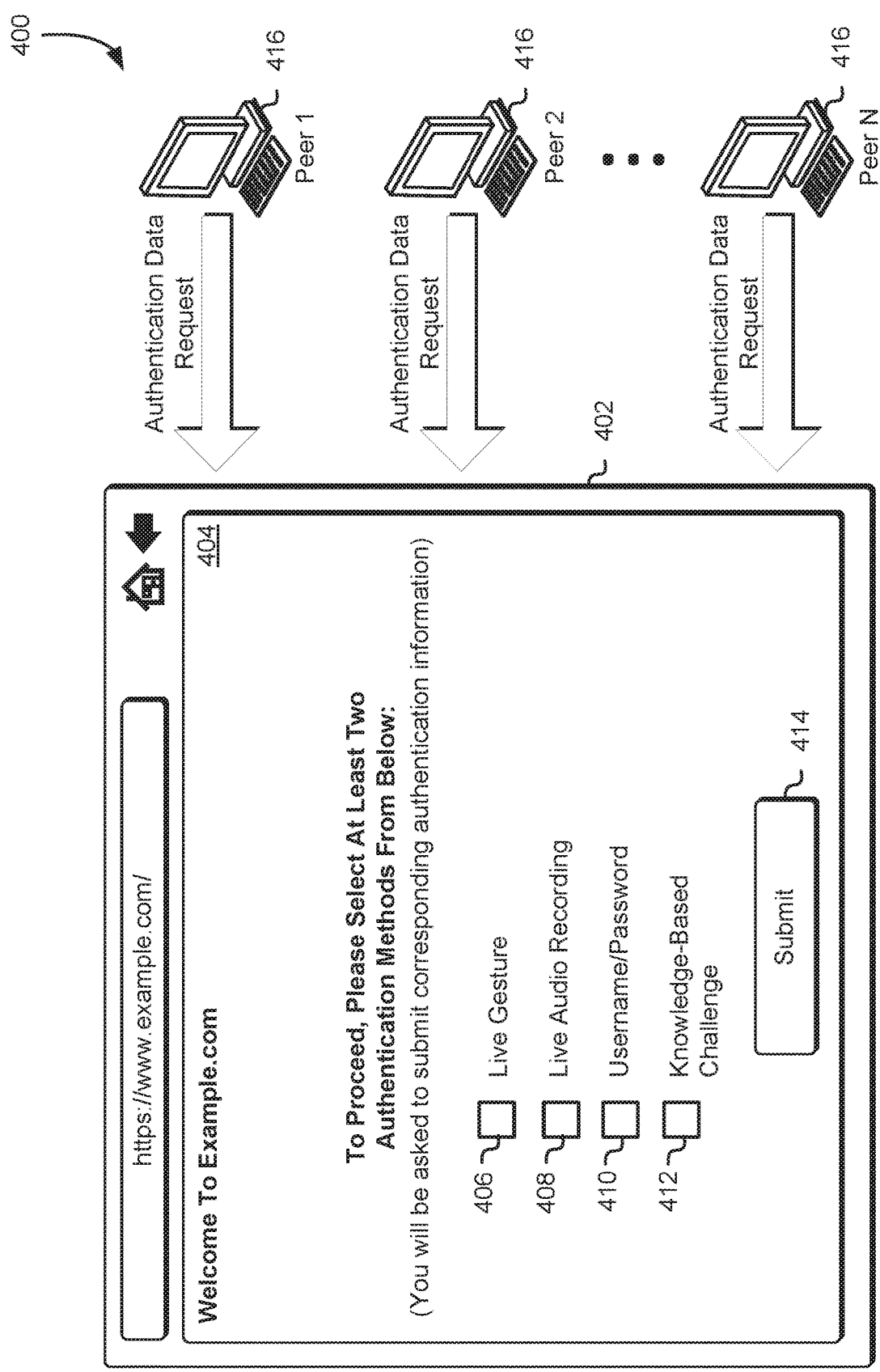
FIG. 4 shows an illustrative example of a system in which peers indicate authentication mechanisms usable to obtain authentication information that is used by the peers for evaluation in accordance with at least one embodiment.

FIG. 4 shows an illustrative example of a system 400 in which peers 416 indicate authentication mechanisms usable to obtain authentication information that is used by the peers 416 for evaluation in accordance with at least one embodiment. In the system 400, the authentication system of the computing resource service updates an interface window 404 of an interface 402 to provide a user with various options for providing authentication information to the authentication system. In an embodiment, the authentication system uses the user's profile and any applicable policies to identify the authentication mechanisms that are usable to obtain the authentication information. The authentication system uses these identified authentication mechanisms available for obtaining the authentication information to update the interface window 404 and present one or more authentication challenges to the user. The update to the interface window 404 enables the user to select from the available authentication challenges and mechanisms for providing its authentication information. These options are presented via a live gesture input box 406, a live audio recording input box 408, a username/password input box 410, and a knowledge-based challenge input box 412, although not all embodiments of the present disclosure will include all such input boxes and additional input boxes are, in some embodiments, presented via the interface window 404 in addition to or as an alternative to the input boxes explicitly described herein. Further, these input boxes are generated based at least in part on the authentication challenges that are presentable to the user.

In an embodiment, the authentication system selects, based at least in part on information specified in the user's profile and the one or more policies applicable to the user's request, a set of peers 416 that are to evaluate the authentication information provided by the user. In one embodiment, a peer 416 can submit an authentication data request that specifies a particular authentication mechanism that the user is required to use to provide its authentication information. In response to this request, the authentication system updates the interface window 404 to indicate that the user is required to provide authentication information using the authentication mechanism specified by the peer 416. In one embodiment, the authentication system updates the interface window 404 to indicate, via an input box, selection of an authentication mechanism. In an embodiment, the user is not authorized to change this selection and, as a result, is prevented from interacting with the selected input box (e.g., user cannot de-select a selected input box via the interface 402, etc.).

The interface window 404, in an embodiment, includes a submit button 414, which is usable to confirm the user's selection of the authentication mechanisms for submitting the authentication information. In response to use of the submit button 414, the authentication system updates the interface 402 to enable the user to provide the authentication information in response to authentication challenges generated using the selected authentication mechanisms. Once the user has provided the authentication information using the selected authentication mechanisms, the authentication system transmits subsets of the authentication information to the set of peers 416. In an embodiment, if a peer 416 requested that a particular authentication mechanism be used to obtain the authentication information, the authentication system provides subsets of the authentication information generated using the particular authentication mechanism to the peer 416.

Figure 5:
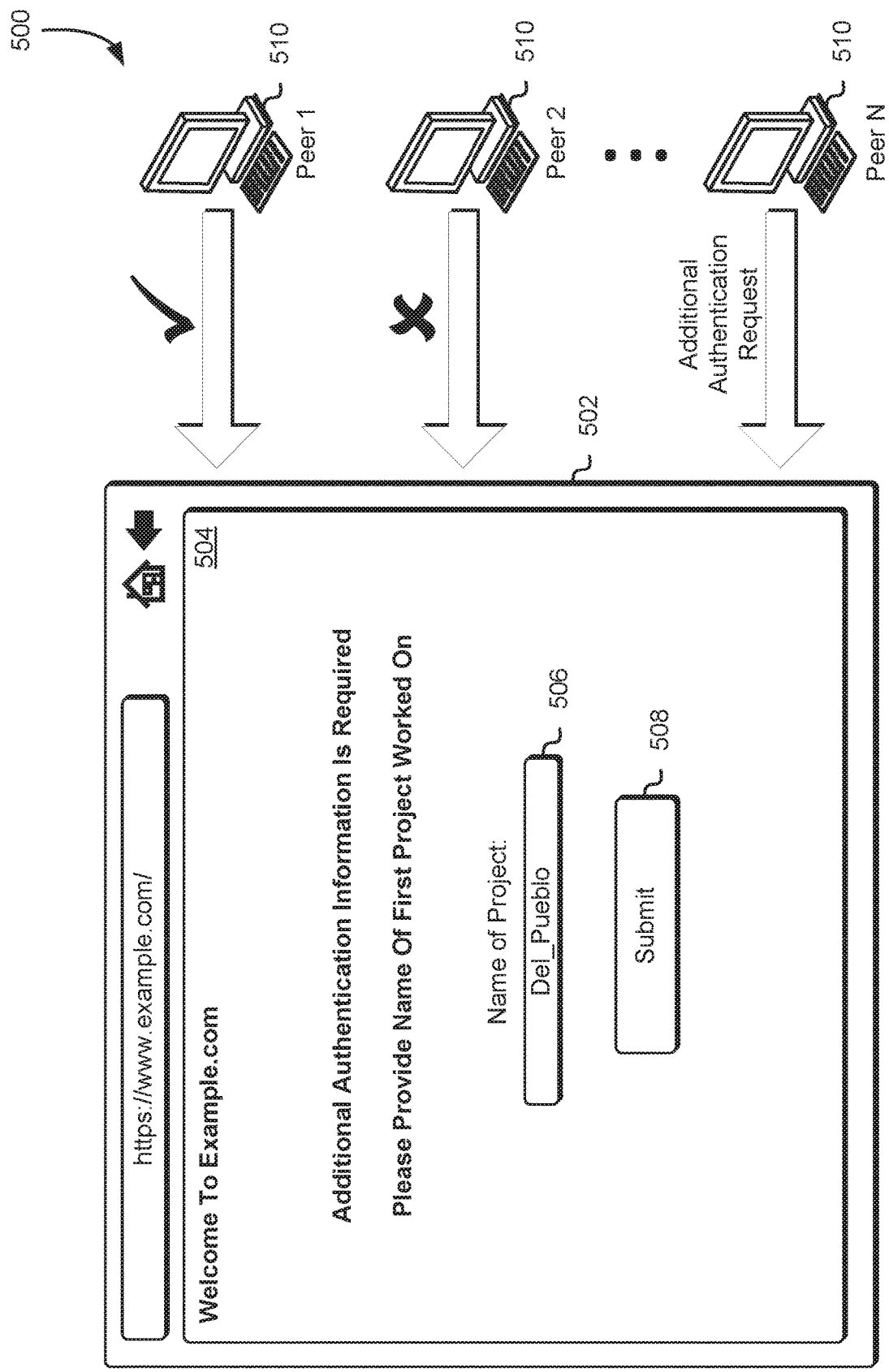
FIG. 5 shows an illustrative example of a system in which a peer requests additional authentication information to make a determination usable by an authentication system to determine whether a threshold is reached for authenticating a user in accordance with at least one embodiment.

FIG. 5 shows an illustrative example of a system 500 in which a peer 510 requests additional authentication information to make a determination usable by an authentication system to determine whether a threshold is reached for authenticating a user in accordance with at least one embodiment. In the system 500, peers 510 provide authentication responses based at least in part on an evaluation of authentication information provided by the user and transmitted to the peers 510 by the authentication system. In an embodiment, a peer 510 (e.g., Peer N, as illustrated in FIG. 5) submits a request to obtain additional authentication information from the user. The request from the peer 510, in an embodiment, specifies a particular authentication mechanism that the authentication system is to present to the user via an interface 502. This additional authentication information is usable by the peer 510 to determine whether the user is authenticated and to generate an authentication response usable by the authentication system to determine whether a threshold has been reached for authentication of the user.

In an embodiment, the authentication system updates an interface window 504 of the interface 502 to present the user with a prompt to provide the requested additional authentication information. Through the interface window 504, the authentication system uses the selected authentication mechanism to elicit a response from the user. As illustrated in FIG. 5, in one embodiment, the authentication mechanism is a knowledge-based challenge whereby a limited audience is capable of providing an accurate response to a challenge. To present the knowledge-based challenge, the authentication system updates the interface window 504 to include a textual representation of the challenge, although not all embodiments of the present disclosure will include a textual representation of a knowledge-based challenge and additional representations are, in some embodiments, presented via the interface window 504 in addition to or as an alternative to the textual representation of the challenge explicitly described herein.

In an embodiment, the authentication system provides, via the interface window 504, an input field 506 through which the user provides its authentication information (e.g., a challenge response). Additionally, the authentication system provides a submit button 508, which is usable by a user to submit the authentication information provided in the input field 506. If the user selects the submit button 508, the authentication system receives the authentication information specified in the input field 506 and provides the authentication information to the peer 510 that requested the additional authentication information. The peer 510 uses this additional authentication information to generate an authentication response usable by the authentication system to determine whether the user is authenticated.

In an embodiment, the authentication system imposes a timeout period during which the user is authorized to provide the requested authentication information. In one embodiment, if the timeout period elapses, the authentication system notes a negative authentication response on behalf of the peer 510 that submitted the authentication information request. The authentication system transmits a notification to the peer 510 to indicate that the requested authentication information was not provided by the user and that the negative authentication response has been generated on its behalf. In another embodiment, the authentication system provides the notification to the peer 510 without generating the negative authentication response. In response to the notification, the peer 510 determines whether to submit additional authentication information requests or to provide an authentication response based at least in part on previously provided authentication information.

Figure 6:
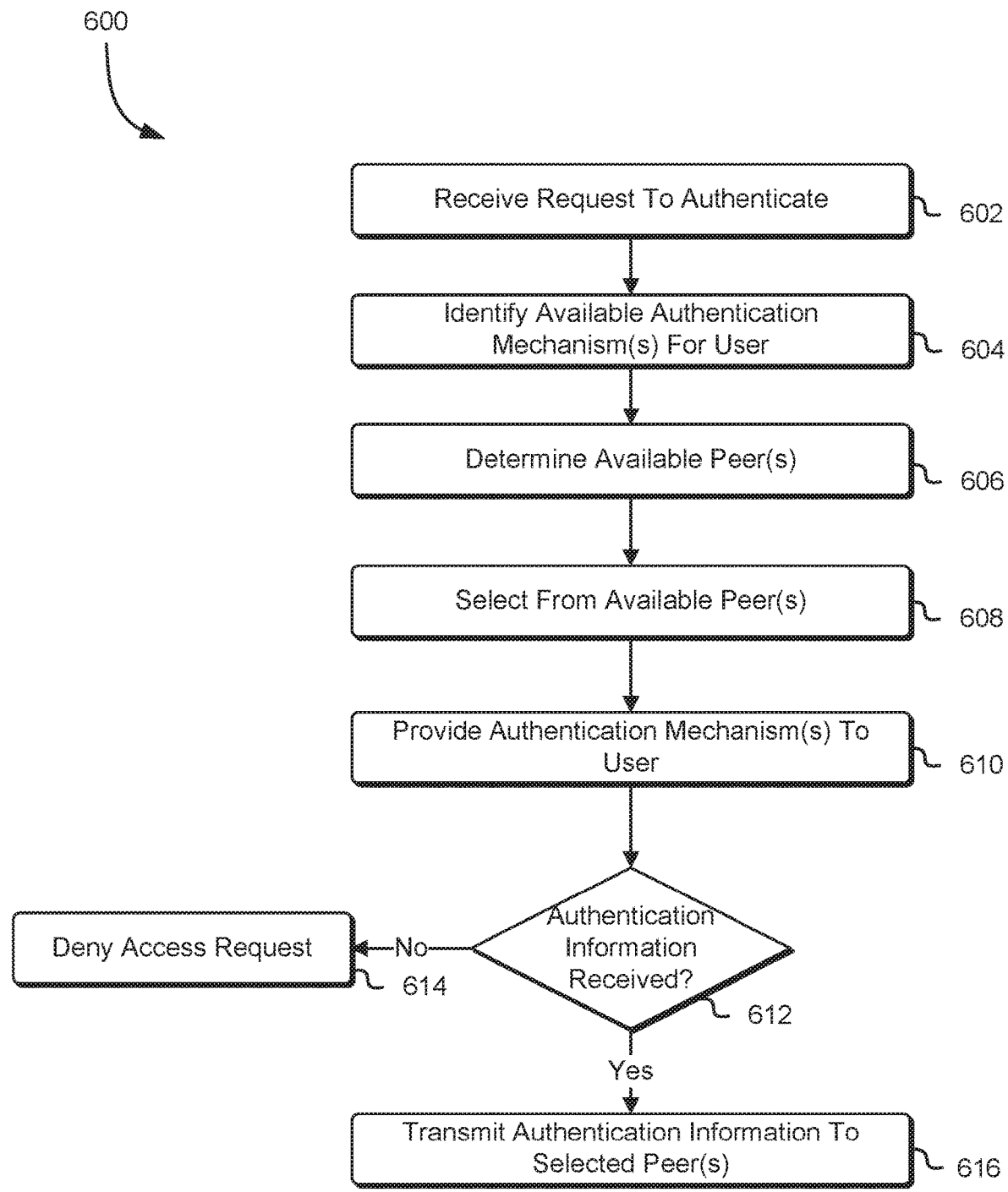
FIG. 6 shows an illustrative example of a process for transmitting authentication information for a user to a set of peers to enable the set of peers to provide individual authentication responses in accordance with at least one embodiment.

FIG. 6 shows an illustrative example of a process 600 for transmitting authentication information for a user to a set of peers to enable the set of peers to provide individual authentication responses in accordance with at least one embodiment. The process 600 is performed by an authentication system of a computing resource service. In an embodiment, the authentication system receives 602, from a user and via an interface provided by the computing resource service, a request to authenticate for accessing one or more computing resources provided by the computing resource service. The request from the user specifies user information, such as a username, that is usable to identify a profile of the user. In response to the request, the authentication system accesses the user's profile to identify any associations of the user (e.g., organizations the user belongs to, etc.), as well as any resources the user has utilized in the past. Additionally, the authentication system transmits a request to a policy management sub-system of the computing resource service to identify one or more policies that are applicable to the user request. The authentication system, in its request to the policy management sub-system, provides user information from the user's profile that is usable to identify any applicable user policies. Additionally, the authentication system provides information regarding the resources requested to enable the policy management sub-system to identify any resource policies applicable to the request. The policies, in an embodiment, specify one or more authentication mechanisms that are required for enabling the user to access the requested resources. These authentication mechanisms can be specific to the user submitting the request or to the requested resources.

The authentication system, in an embodiment, evaluates the policies from the policy management sub-system and the information from the user's profile to identify 604 the authentication mechanisms usable to elicit authentication information from the user. In an embodiment, the authentication system accesses a peer database maintained by the computing resource service to determine 606 a set of peers that are available to evaluate any authentication information provided by the user using the identified authentication mechanisms. Each entry in the peer database, in an embodiment, defines the types of authentication information that a corresponding peer is capable of evaluating. Each entry in the peer database specifies the role of the corresponding peer within the user's organization or with regard to the computing resource service. An entry in the peer database also specifies the weight that is given to authentication responses from the corresponding peer. This weight is used by the authentication system to determine whether a threshold has been reached based at least in part on obtained authentication responses from the set of peers. In an embodiment, each entry in the peer database also specifies a reputation score for the corresponding peer, which is used by the authentication system to select 608, from an ordering of the available peers, a set of peers that is to evaluate authentication information from the user to generate authentication responses for the authentication system. In one embodiment, the ordering of the set of available peers is a ranking, whereby a peer is given a higher ranking based at least in part on its corresponding reputation score.

In an embodiment, the authentication system transmits a notification to the selected peers to determine whether the selected available peers can provide authentication responses that are sufficient to reach a threshold. If a threshold cannot be reached with the selected set of peers, the authentication system determines whether other peers are available to perform the evaluation of the authentication information. If no other peers are available for evaluating the authentication information, the authentication system denies the request, as no threshold is attainable for forming a quorum. In one embodiment, instead of denying the request, the authentication system determines whether other methods for authentication are usable for authentication of the user. If so, the authentication system prompts the user to provide authentication information using these other methods. However, if other peers are available to perform the evaluation of the authentication information, the authentication system selects a subset of these other available peers.

In an embodiment, the authentication system updates the interface to provide 610 one or more of the identified authentication mechanisms to the user. In an embodiment, the authentication system utilizes the authentication mechanisms to generate one or more authentication challenges that are presented to the user to obtain authentication information from the user. In an embodiment, the user utilizes the interface to provide its authentication information using the identified authentication mechanisms. Alternatively, the user can opt to provide no authentication information and allow the request to timeout. Thus, the authentication system determines 612 whether authentication information has been received from the user. If no authentication information has been received (e.g., a timeout period has elapsed without receiving the authentication information), the authentication system denies 614 the request to access the computing resource service. However, if the authentication system receives authentication information from the user, the authentication system transmits 616 the authentication information to the selected peers for evaluation. In one embodiment, the authentication system parses the received authentication information according to the capabilities of the selected peers to evaluate the authentication information. Thus, the authentication system transmits, in an embodiment, a unique subset of the authentication information to each selected peer for evaluation. Alternatively, the authentication system transmits a subset of the authentication information to peers that are capable of evaluating the subset.

Figure 7:
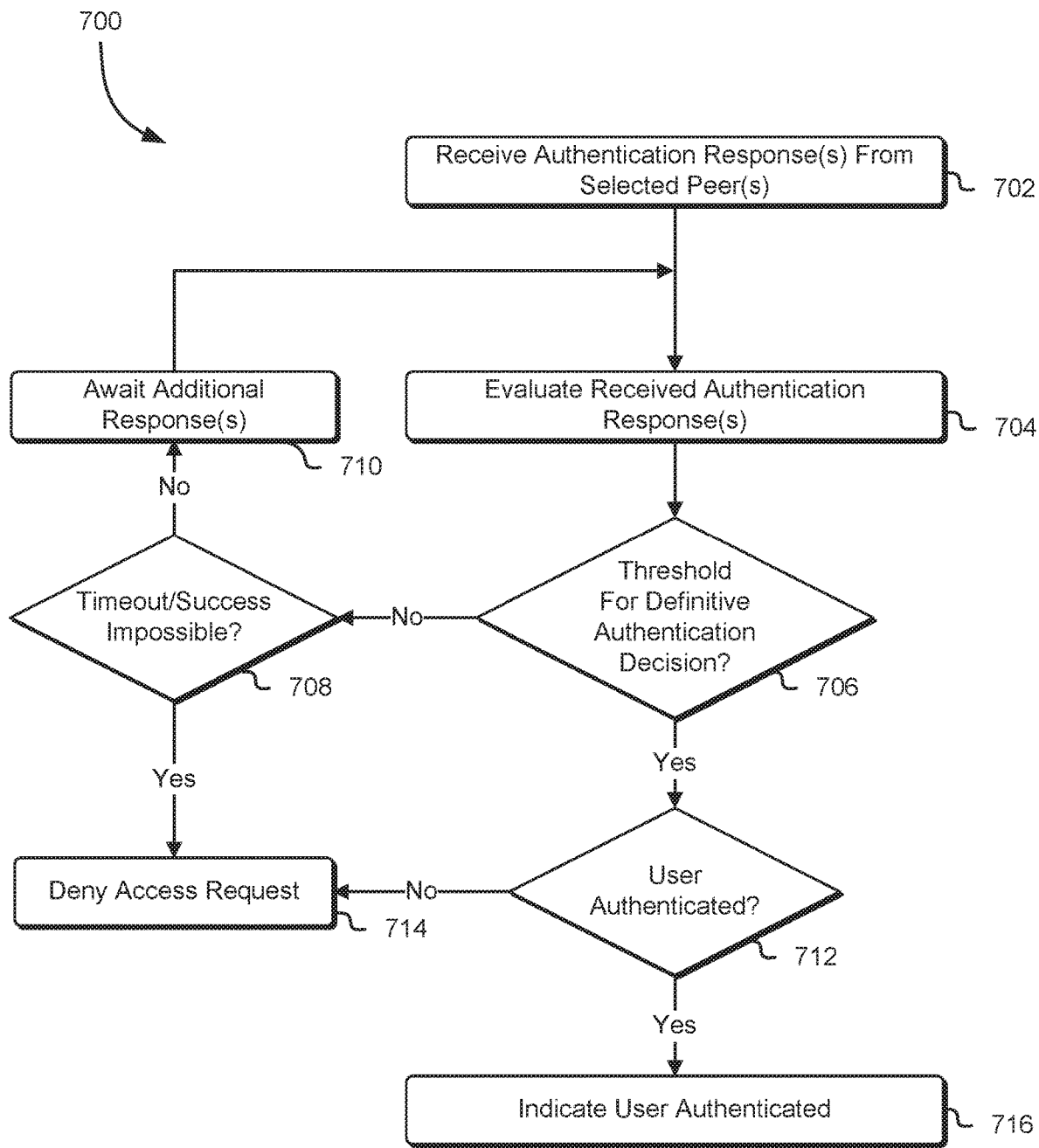
FIG. 7 shows an illustrative example of a process for determining whether a threshold has been reached based at least in part on authentication responses from a set of peers in accordance with at least one embodiment.

FIG. 7 shows an illustrative example of a process 700 for determining whether a threshold has been reached based at least in part on authentication responses from a set of peers in accordance with at least one embodiment. The process 700 is performed by the authentication system, which obtains authentication responses from one or more peers and evaluates these responses to determine whether a threshold has been reached. This threshold is used to determine whether a quorum has been formed regarding an authentication decision based at least in part on authentication information provided by a user. In an embodiment, at a time after providing the user's authentication information to a set of peers for evaluation, the authentication system receives 702 one or more authentication responses from one or more peers. The one or more authentication responses specify whether the user is authenticated by the corresponding peer.

In response to receiving one or more authentication responses from one or more peers, the authentication system, in an embodiment, evaluates 704 these authentication responses to determine 706 whether a threshold has been reached for definitively determining an authentication decision. As noted above, in one embodiment, a threshold is reached if a requirement for formation of a quorum is satisfied based at least in part on the obtained responses. In an embodiment, a threshold is reached if the majority of authentication responses from the set of peers indicate that either the user is authenticated or not. In another embodiment, a threshold is reached if at least a minimum number of peers designated as administrators or group leaders of the user's group indicate that the user has been authenticated or not. The authentication system evaluates the received authentication responses against these one or more thresholds for generating an authentication decision.

If no thresholds have been reached, the authentication system determines 708, in an embodiment, whether a timeout period for receiving additional authentication responses has passed and/or whether it is still possible for a threshold to be reached. If the timeout period has elapsed without a threshold being reached or, based at least in part on the received responses, it is no longer possible to reach a threshold, the authentication system denies 714 the user's request. However, if the timeout period has not elapsed and a threshold is still reachable, the authentication system awaits 710 additional responses from the remaining peers of the set of peers. As new responses are received, the authentication system continues to evaluate these responses to determine whether a threshold has been reached. In an embodiment, the authentication system receives a request from a peer to obtain additional authentication information from the user to generate an authentication response. In response to the request, the authentication system prompts the user to provide the requested authentication information using an authentication mechanism defined by the peer. The authentication system provides the additional authentication information to the peer that submitted the request. In an embodiment, in response to such a request, the timeout period is extended to enable the peer to prepare an authentication response that is usable to determine whether a threshold has been reached for determining an authentication decision.

If a threshold is reached, the authentication system determines 712, in an embodiment, whether, based at least in part on the received authentication responses, the user has been authenticated by the set of peers. In an embodiment, the authentication system denies 714 the user's request if the authentication responses that satisfy the threshold indicate that the user has not been authenticated by the set of peers. However, if the authentication responses indicate that the user has been authentication by the set of peers, the authentication system indicates 716 that the user has been authenticated. In an embodiment, the authentication system transmits a message to the interface or to a web-based server that operates the interface to indicate that the user has been authenticated. In one embodiment, the message is digitally signed by the authentication system such that the web-based server can verify that the message is from the authentication system and has not been tampered with. The authentication system, in one embodiment, transmits a bearer token to the web-based server, which is provided to the user. This enables the user to provide the bearer token and avoid further authentication processes, at least until the bearer token expires.

Figure 8:
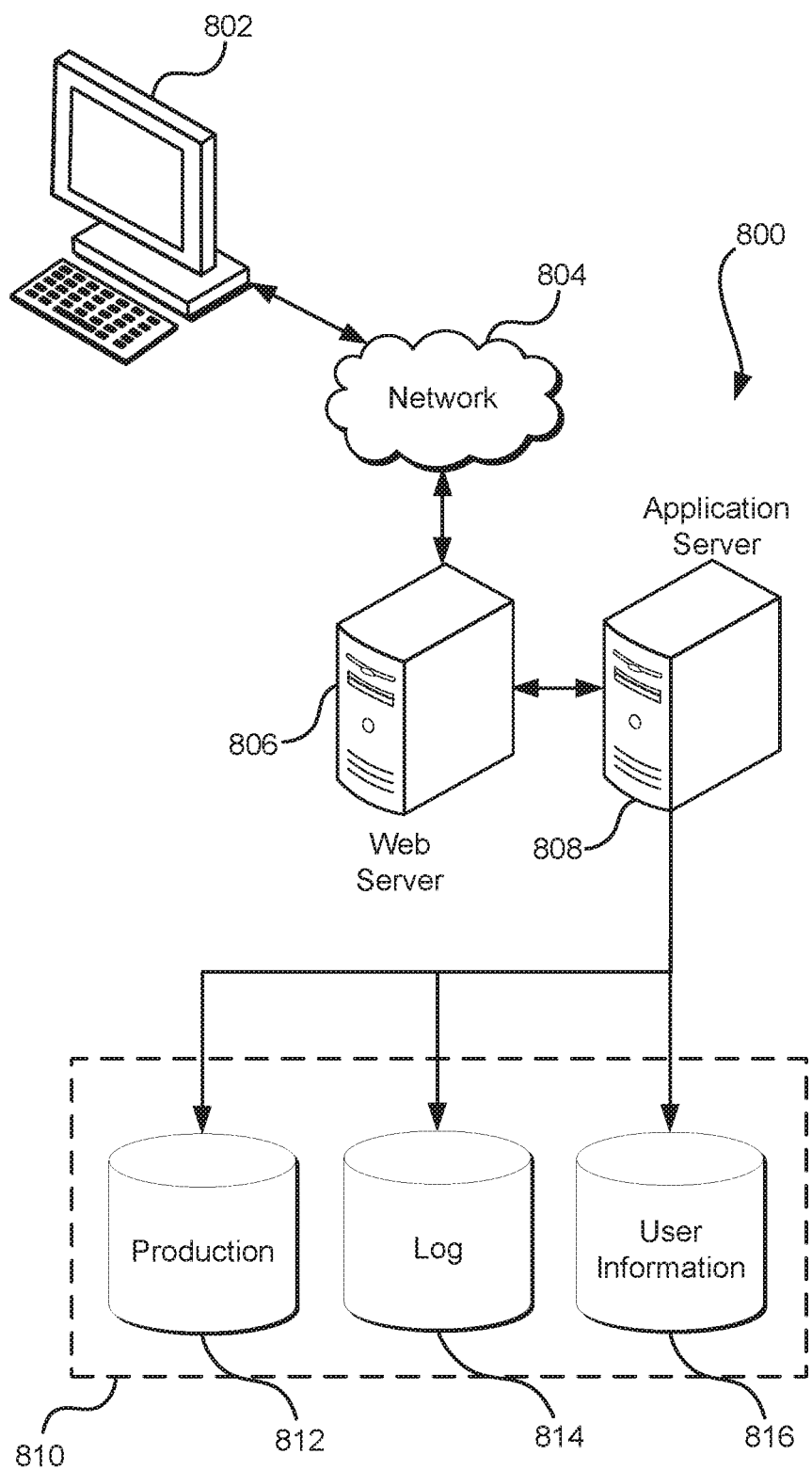
FIG. 8 illustrates a system in which various embodiments can be implemented.

FIG. 8 illustrates aspects of an example system 800 for implementing aspects in accordance with various embodiments. As will be appreciated, although a web-based system is used for purposes of explanation, different systems may be used, as appropriate, to implement various embodiments. The system includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

The illustrative system includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language.

Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The system, in one embodiment, is a distributed and/or virtual computing system utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The system can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a client device utilized by a first user, a request to access a web-based service;
   identifying a plurality of second users from a database that specifies a weight associated with a plurality of roles of second users in relation to the first user, based at least in part on a reputation score of each second user, wherein the reputation score relates to accuracy or speed of the second user in evaluating responses to authentication challenges by a plurality of third users;
   selecting, based at least in part on identifying information of the first user and policies applicable to the request to access the web-based service, a set of authentication mechanisms;
   obtaining, from the plurality of second users, a set of authentication challenges based at least in part on the set of authentication mechanisms to provide to the first user;
   transmitting, in response to the request and to the client device, the set of authentication challenges to be completed by the first user;
   obtaining a set of responses to the set of authentication challenges from the client device;
   transmitting the set of responses to the plurality of second users;
   obtaining, from at least some of the plurality of second users, verification of the set of responses; and
   as a result of obtaining an indication that a response has been obtained from a quorum of the plurality of second users indicating that the first user has been authenticated, causing the first user to access the web-based service, wherein the quorum is determined at least in part on the weight associated with the plurality of roles of second users in relation to the first user.

2. The computer-implemented method of claim 1, further comprising:
   obtaining, from a second user of the plurality of second users, a request to transmit an additional authentication challenge to the client device and to be completed by the first user, the additional authentication challenge being distinct from the set of authentication challenges;
   transmitting, to the client device, the additional authentication challenge;
   obtaining, from the client device, a second response to the additional authentication challenge; and
   transmitting the second response to the second user to cause the second user to verify the second response.

3. The computer-implemented method of claim 1, wherein the plurality of second users are identified based at least in part on the set of responses from the client device.

4. A system, comprising:
   one or more processors;
   memory storing computer-executable instructions that, if executed by one or more processors, cause the system to:
      obtain a request to access a web-based service, the request including authentication information of a first user;
      select, based at least in part on identifying information of the first user and policies applicable to the request to access the web-based service, a set of authentication mechanisms;

provide the authentication information to a plurality of second users, the plurality of second users:
selected according to accuracy or speed of providing authentication to previous responses to authentication challenges by a plurality of third users; and
assigned a weight associated with a plurality of roles of second users;
obtain, from the plurality of second users, a set of authentication challenges based at least in part on the set of authentication mechanism;
provide the set of authentication challenges to the first user;
obtain, from the first user, a set of responses to the set of authentication challenges;
provide the set of responses to the plurality of second users;
obtain, from at least a quorum of second users of the plurality of second users, an indication that an identity of the first user is authenticated based at least in part on the set of authentication challenges, the quorum of second users based at least in part on the weight associated with the plurality of roles of second users; and
cause the first user to access the web-based service in response to the indication from the at least a quorum of second users of the plurality of second users that the identity of the first user is authenticated.

5. The system of claim 4, wherein the quorum of second users of the plurality of second users corresponds to a majority of the plurality of second users.

6. The system of claim 4, wherein the instructions further cause the system to divide the authentication information into a plurality of subsets of the authentication information, wherein each subset of the plurality of subsets corresponds to a data type.

7. The system of claim 4, wherein the instructions further cause the system to:
obtain, from a second user of the plurality of second users, a request to obtain additional authentication information to cause the second user to generate an authentication response;
transmit a request to the first user to provide the additional authentication information; and
provide the additional authentication information to the second user to cause the second user to generate the authentication response.

8. The system of claim 4, wherein the instructions further cause system to select the plurality of second users based at least in part on the authentication information from the first user.

9. The system of claim 4, wherein the authentication information includes an audiovisual recording generated by the first user.

10. The system of claim 4, wherein the authentication information includes a non-facial gesture recorded using a peripheral device of the first user.

11. A non-transitory computer-readable storage medium storing thereon a set of instructions that, if executed by one or more processors of a computer system, cause the computer system to at least:
obtain a request, from a client device utilized by a first user, a request to access a computing resource service, the request comprising authentication information of the first user;
select, based at least in part on identifying information of the first user and policies applicable to a request to access the computing resource service, a set of authentication mechanisms;
select, from a database that assigns a weight associated with a plurality of roles of second users, a plurality of second users to evaluate the authentication information based on performance evaluation of past authentication information from a plurality of third users, the performance evaluation indicating performance of each second user based on accuracy or speed;
obtain, from the plurality of second users, a set of authentication challenges selected by the plurality of second users based at least in part on the authentication information and the set of authentication mechanisms;
obtain, from the first user, a set of responses to the set of authentication challenges; and
cause the first user to access the computing resource service in response to an indication from a quorum of second users of the plurality of second users that the first user is authenticated, the quorum of second users based at least in part on the weight.

12. The non-transitory computer-readable storage medium of claim 11, wherein the authentication information is an audiovisual recording generated by the first user in response to an authentication challenge.

13. The non-transitory computer-readable storage medium of claim 11, wherein the instructions further cause the computer system to:
obtain, from a second user of the plurality of second users, a request to obtain additional authentication information using an authentication method selected by the second user;
transmit an authentication challenge to the client device to cause the first user to provide, through the client device, the additional authentication information, the authentication challenge generated based at least in part on the authentication method; and
provide the additional authentication information to the second user to cause the second user to evaluate the additional authentication information to generate an authentication response.

14. The non-transitory computer-readable storage medium of claim 11, wherein the instructions further cause the computer system to:
divide the authentication information into a plurality of subsets of the authentication information, wherein each subset of the plurality of subsets corresponds to a data type; and
transmit, to each second user of the plurality of second users, a subset of the authentication information.

15. The non-transitory computer-readable storage medium of claim 11, wherein the authentication information includes a facial gesture recorded using a peripheral device of the client device.

16. The non-transitory computer-readable storage medium of claim 11, wherein the instructions further cause the computer system to select the plurality of second users based at least in part on the authentication information from the first user.

17. The non-transitory computer-readable storage medium of claim 11, wherein the quorum of second users of the plurality of second users corresponds to a majority of the plurality of second users.

18. The computer-implemented method of claim 1, wherein the set of users is selected according to an ability to evaluate an element of the set of responses.

\* \* \* \* \*